United States Patent
Fallah et al.

(10) Patent No.: US 7,366,951 B2
(45) Date of Patent: Apr. 29, 2008

(54) METHOD AND APPARATUS FOR TEST PROGRAM GENERATION BASED ON AN INSTRUCTION SET DESCRIPTION OF A PROCESSOR

(75) Inventors: Farzan Fallah, San Jose, CA (US); Koichiro Takayama, San Jose, CA (US)

(73) Assignee: Fujitsu, Limited, Kawasaki (JP)

( * ) Notice: Subject to any disclaimer, the term of this patent is extended or adjusted under 35 U.S.C. 154(b) by 823 days.

(21) Appl. No.: 10/155,801

(22) Filed: May 24, 2002

(65) Prior Publication Data

US 2003/0220780 A1 Nov. 27, 2003

(51) Int. Cl.
*G06F 11/00* (2006.01)

(52) U.S. Cl. .......................................... 714/33; 714/32

(58) Field of Classification Search ................ 714/32, 714/33
See application file for complete search history.

(56) References Cited

U.S. PATENT DOCUMENTS

| | | | |
|---|---|---|---|
| 5,724,504 A * | 3/1998 | Aharon et al. ................ 714/33 |
| 5,894,424 A * | 4/1999 | Motohama et al. ......... 702/117 |
| 5,956,478 A * | 9/1999 | Huggins ..................... 714/33 |
| 6,006,025 A * | 12/1999 | Cook et al. .................... 716/14 |
| 6,112,312 A * | 8/2000 | Parker et al. .................. 714/32 |
| 6,611,779 B2 * | 8/2003 | Kohno et al. ................ 702/117 |
| 6,647,513 B1 * | 11/2003 | Hekmatpour ................ 714/37 |
| 2002/0002698 A1 * | 1/2002 | Hekmatpour .................... 716/4 |
| 2002/0004918 A1 * | 1/2002 | Mathieu et al. ............... 714/30 |

OTHER PUBLICATIONS

Patterson, Davaid A., Hennessy, John I.; Computer Organization & Desing: The Hardware/Software Interface; 1998; Morgan Kaufmann Publishers, Inc.; Second Edition; pp. 106-107 and 274.*
Fallah, F., Takayama, K.; A New Functional Test Program Generation Methodology; Proceedings. 2001 International Conference on computer Design; Sep. 23-26, 2001; pp. 76-81.*
Hadjiyiannis, G., Hanono, S., Devadas, S.; ISDL: An Instruction Set Description Language For Retargetability; Proceedings of the 34th Design Automation Conference, 1997; Jun. 9-13, 1997; pp. 299-302.*
Balcer et al.; Automatic Generation of Test Scripts from Formal Test Specifications; Dec. 1989; ACM SIGSOFT Software Engineering Notes, vol. 14, Issue 8; pp. 210-218.*

* cited by examiner

*Primary Examiner*—Joshua Lohn
(74) *Attorney, Agent, or Firm*—Christie, Parker & Hale, LLP (57) ABSTRACT

A method and apparatus for generating processor test programs using a formal description of the processor's instruction set. An instruction set for a processor is formally described using a language such as ISDL. The formal description of the instruction set identifies certain characteristics of the instructions making up the instruction set. The formal description is combined with a test specification that describes desired properties of a test program by formally specifying test sequences that are to be applied to instructions having particular characteristics. A test program is generated by applying the formal test specification to the formal description of the instruction set including test sequences applicable to instructions having the particular characteristics.

46 Claims, 6 Drawing Sheets

```
INCREMENTAL(TSE, NEW-ITEM) {
    ƒoreach clause C in TSE
        if C can be instantiated to NEW-ITEM {
            Construct TSE' by instantiating C to NEW-ITEM in TSE.
            Generate test sequences by instantiating all other
                clauses to all possible combinations.
            forall instances of C != NEW-ITEM
                INCREMENTAL(TSE', NEW-ITEM).
        }
}
```

FIG. 6

```
COMPACTION(List of TSEs) {
    WHILE (There are two overlapping TSEs) {
        Find TSE1 and TSE2 with the highest overlap degree.
        Combine TSE1 and TSE2.
    }
    Instantiate TSEs.
}
```

FIG. 7

METHOD AND APPARATUS FOR TEST PROGRAM GENERATION BASED ON AN INSTRUCTION SET DESCRIPTION OF A PROCESSOR

BACKGROUND OF THE INVENTION

The present invention relates generally to circuit verification and more specifically to generation of test programs useful in circuit verification or validation.

Validation may be one of the most challenging tasks in processor design. Processor validation is often accomplished, at least in part, by executing programs on the processor, or on intermediate models of the processor, and comparing results of the programs against a model.

The ability to find errors in the processor is often dependent on the quality of the test programs. Designers often prepare some test programs manually to target a specific portion of the processor. For the rest of the processor, designers often use randomly generated test programs or real application programs to validate the entire processor.

A designer's insights and experience sometimes result in the manually generated test programs being useful in finding design errors in a specific part of the processor. On the other hand, writing test programs manually may be time consuming and generally cannot be used to generate long programs to validate an entire processor design. Another problem with manual generation is that the designer writing the programs should have a good understanding of the design, and the number of such people is generally limited.

Long randomly generated test programs or application programs can be used to validate the entire processor, but such programs may not target a specific portion of the processor and validate that portion under different scenarios.

As a third approach, it is possible to use an automatic tool to generate test programs based on the actual implementation of the processor. This approach helps to generate test programs to validate some implementation details that can be missed by other methods.

SUMMARY OF THE INVENTION

A method and apparatus for generating processor test programs using a formal description of the processor's instruction set is provided. An instruction set for a processor is formally described using a language such as Instruction Set Description Language (ISDL). The formal description of the instruction set identifies certain characteristics of the instructions making up the instruction set. The formal description is combined with a test specification that describes desired properties of a test program by formally specifying test sequences that are to be applied to instructions having particular characteristics. A test program is generated by applying the formal test specification to the formal description of the instruction set including test sequences applicable to instructions having the particular characteristics.

In one aspect of the invention, a method for generating a test program for a processor includes receiving a formal description of an instruction set for the processor along with a formal description of a test specification in the form of a Test Specification Expression (TSE). The test program is generated using the formal description of the instruction set and the formal description of the test specification.

In another aspect of the invention, the instruction set is classified into categories including arithmetic, logical, memory, control, and miscellaneous classes.

In another aspect of the invention, instruction relationships are entered by a designer and generating a test program further includes using the instruction relationship, the formal description of the instruction set, and the formal description of the test specification.

In another aspect of the invention, TSEs may be used as incremental test specifications and include nested test specification expressions. The TSEs may further include: an operator to generate all possible instantiations of an expression; an operator to generate a specific number of different instantiations of an expression; a set definition operator; a complement operator; a conjunction operator; an equality operator; an operator for repeating an expression a specified number of times; and an expression labeling operator.

In another aspect of the invention, test programs are generated for a processor design with the processor design being based on a specification of a processor. The test program is applied to the processor design and causes a specified operation of the processor design. The specified operation of the processor design forms results for comparison with the specification of the processor. The test programs are generated by formally describing an instruction set for the processor with the instruction set for the processor including multiple instructions and a formal description of the instruction set providing definitions for instructions of the multiple instructions. In addition, a formal description of a test specification using expressions with the expressions representing the desired properties of a program is used to generate a test program using the formal description of the instruction set with the definitions for instructions of the multiple instructions being mappable to expressions of the test specification and the instructions of the instruction set being mappable to the definitions for instructions of the multiple instructions.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
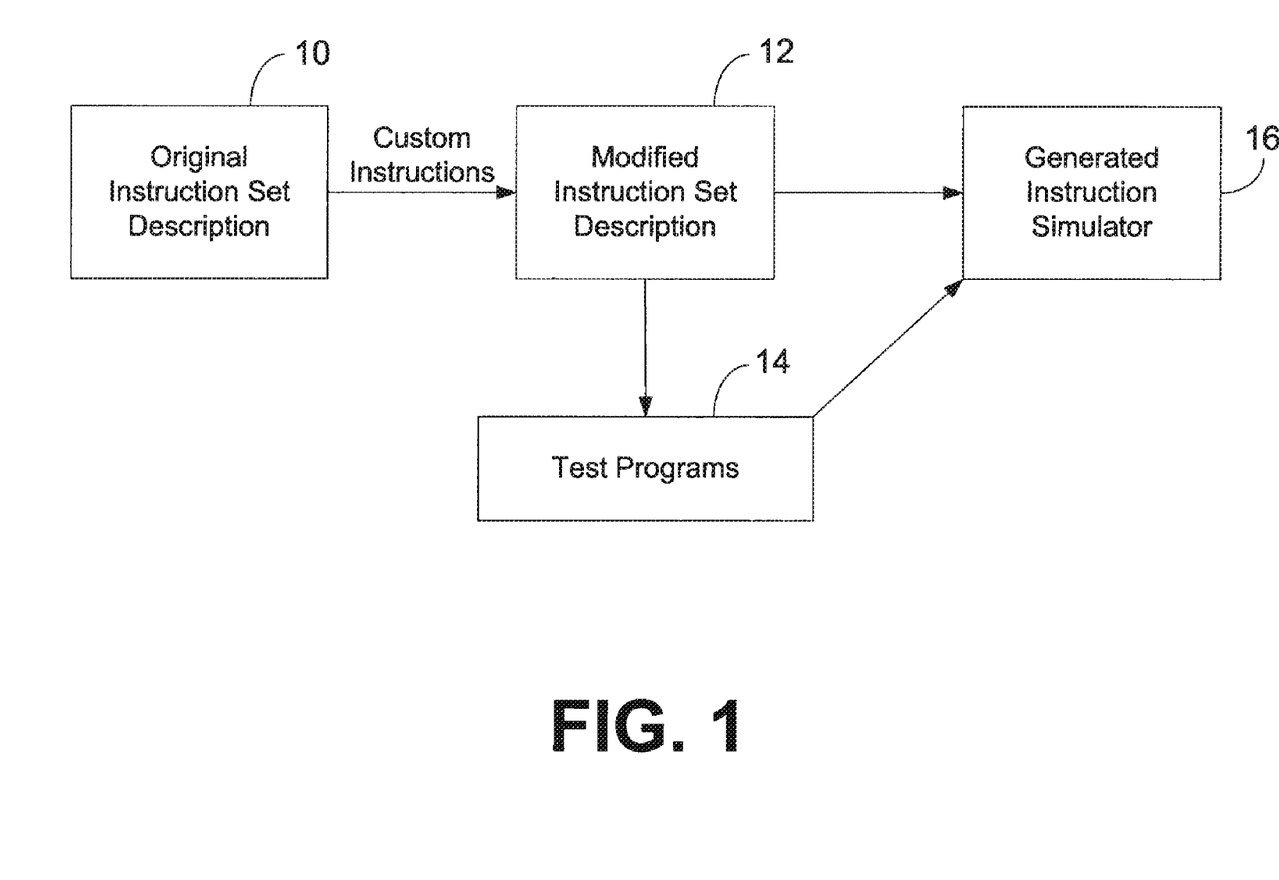
FIG. 1 is a data flow diagram for a test program generation system in accordance with an exemplary embodiment of the present invention.

FIG. 1 is a data flow diagram for a test program generation system in accordance with an exemplary embodiment of the present invention. A description 10 of an instruction set for a processor is analyzed and modified to generate a modified instruction set description 12. The modified instruction set description is used to generate test programs 14 for the described processor. The test programs are used in an instruction set simulator 16, that simulates processor operation using the modified instruction set description, to determine the correctness of the processor's design.

Figure 2:
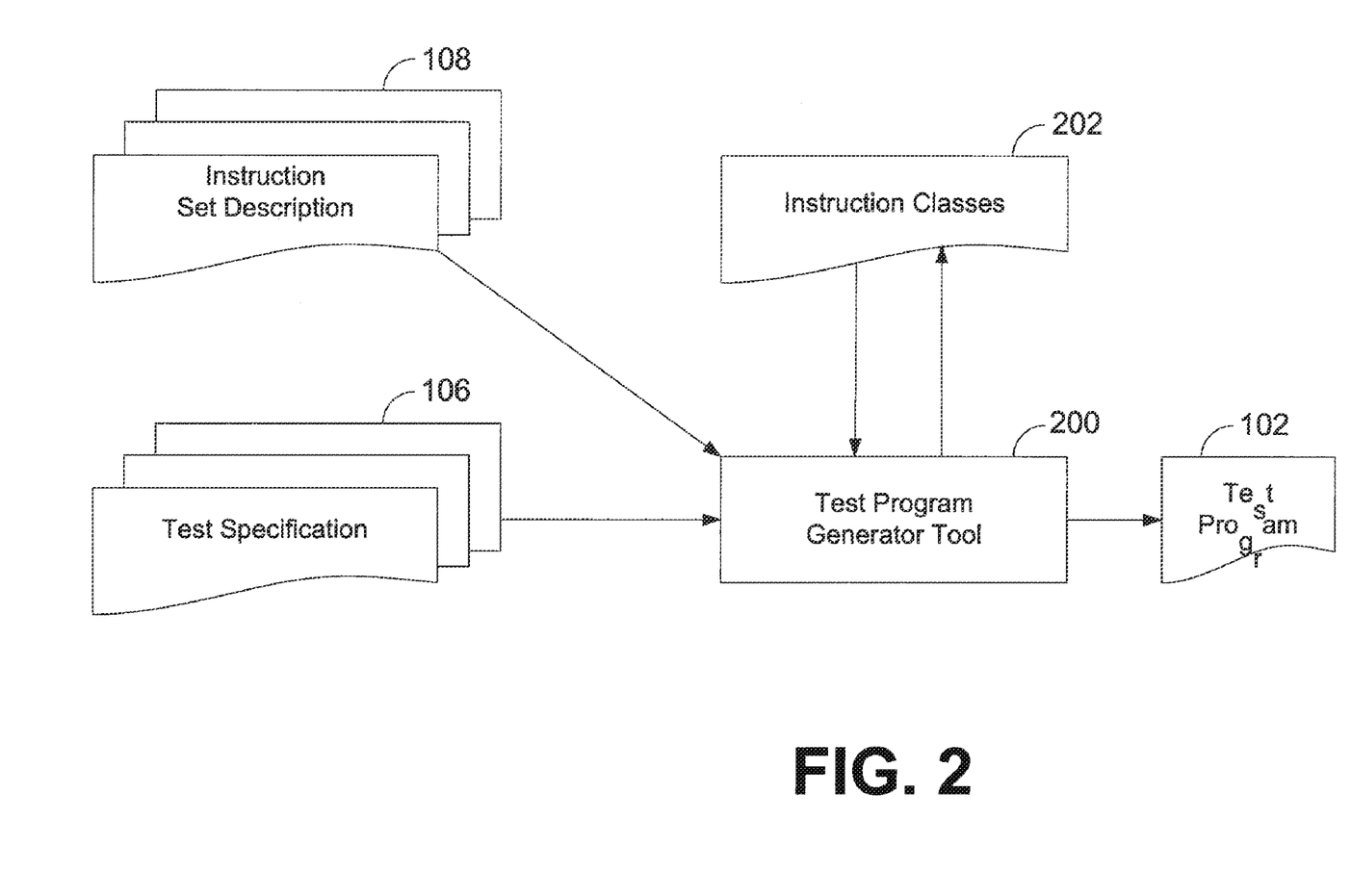
FIG. 2 is a process flow diagram of a test program generation tool in accordance with an exemplary embodiment of the present invention.

FIG. 2 is a process flow diagram of a test program generator tool in accordance with an exemplary embodiment of the present invention. A test program generator tool 200 receives a file 106 including a test specification expression and a file 108 including a description of an instruction set for a processor. The test specification includes instructions used by the test program generator to generate a test program 102. Once generated, the test program is executed by a processor simulator or an actual processor in order to test the correctness of the processor's design.

In a test program generator tool in accordance with an exemplary embodiment of the present invention, the instructions for the test specification are encoded as a Test Specification Expression (TSE). A TSE encodes a description of how a test program should be generated to test specified features or processes of the processor as formally described in the instruction set description. The TSE describes the features the processor to be tested in terms of characterizations of the processor's instructions. The test program generation tool characterizes the instructions by placing individual instructions into categories or classes using the formal definition of the instruction as included in the instruction set description. The characterized instruction set is stored in an instruction class file 202 for later analysis.

Figure 3:
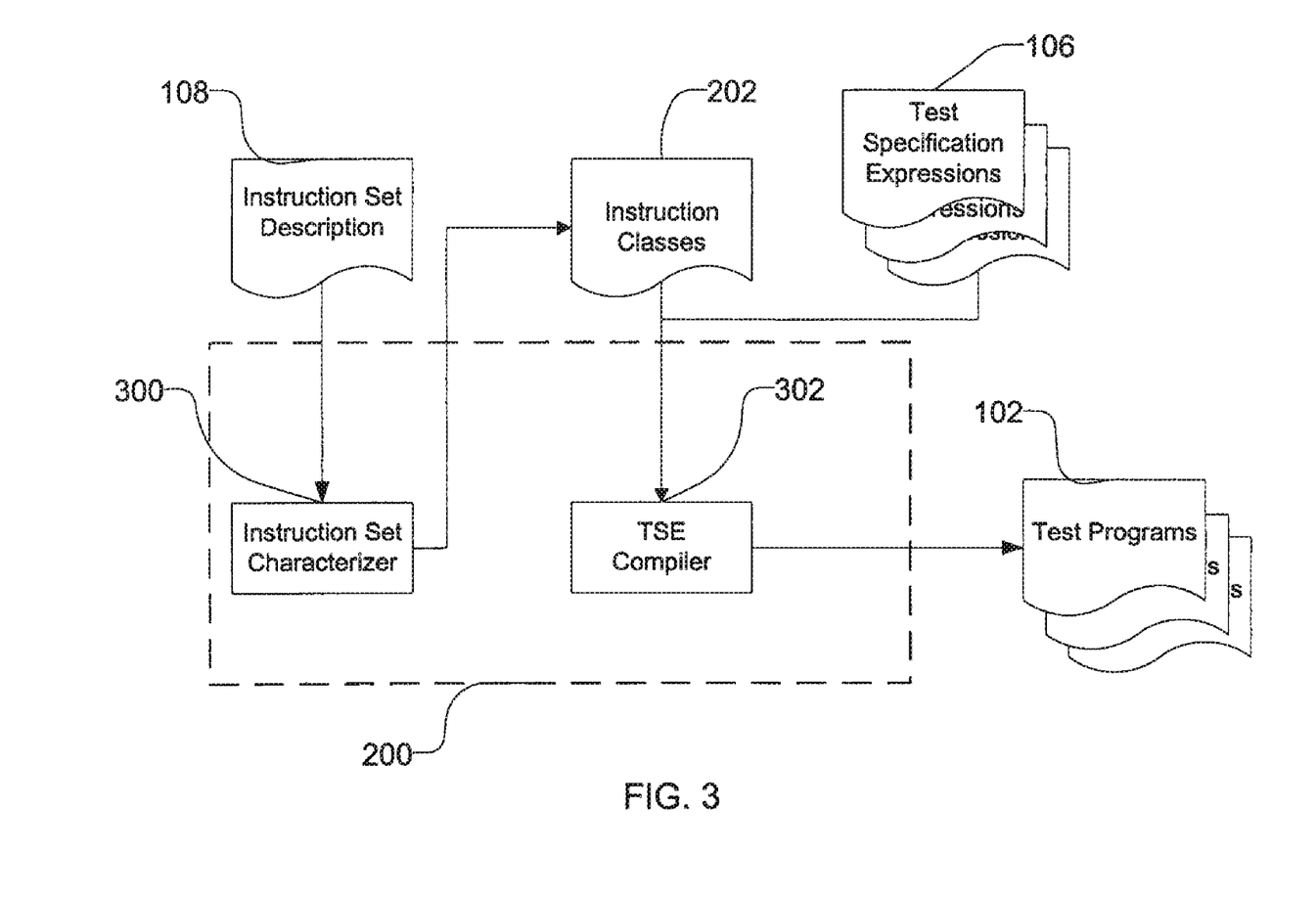
FIG. 3 is a process flow diagram describing the processes within a test program generation tool in accordance with an exemplary embodiment of the present invention.

FIG. 3 is a process flow diagram illustrating the processes within a test program generator tool in accordance with an exemplary embodiment of the present invention. A test program generator tool 200 receives as an input an instruction set description 108 of a processor. The program generation tool uses an instruction set characterizer 300 to generate a categorized instruction set description organized into instruction classes 202. The instruction classes are used in conjunction with TSEs 104 as input into a TSE compiler 302. The TSE compiler parses a TSE and generates a test program 102 as specified by the TSE using the categories as stored in the instruction class description.

In a test program generation tool in accordance with an exemplary embodiment of the present invention, the processor's instruction set is formally described using Instruction Set Description Language (ISDL), a public domain machine description language. The following is an exemplary ISDL definition of an add instruction for a processor:

```
add RA, RB, RC
    {W.OP = 0x1; W.RA = RA;
    W.RB = RB; W.RC = RC}
    {RC <-(RA+RB);}
    {Cycle = 1; Stall = 0; Size = 1}
    {Latency = 1; Usage = 1}
```

In ISDL, every instruction has several fields. For example, "W.OP" is a field that defines the operation of the instruction. "Cycle" is another field that defines the number of cycles necessary to execute the instruction. More information about the ISDL language can be found in "ISDL: An Instruction Set Description Language for Retargetability" in *Proceedings of the 34th Design Automation Conference* by G. Hadjiyiannis et al. which is hereby incorporated by reference as if fully stated herein.

In a test program generation tool in accordance with an exemplary embodiment of the present invention, test program generation starts with processing the Register Transfer Language (RTL) fields of every instruction in an ISDL description to find all instructions belonging to predefined categories. Some of the predefined categories are, ALU, Memory, and Control. There are also combinations of the above categories, e.g., ALU-Memory. As an example, an instruction that reads two numbers from memory and adds them is included in the ALU-MEMORY category. The categories may be divided to subcategories. For example, an ALU category can be divided to two Arithmetic and Logical subcategories. Categories allow the grouping of instructions with similar processor execution behavior into one category. This grouping can be used by designers to write higher level expressions. In addition, designers may come up with their own categories and use them when writing a test specification or modify the categories generated by the test program generation tool. After categorizing the instructions, a pre-written test specification, or one provided by a designer, is used to generate test programs.

In a test program generation tool in accordance with an exemplary embodiment of the present invention, test specifications are formally described using Test Specification Expressions (TSEs). A TSE describes desired properties of a test program and is used to generate test programs that satisfy those properties. Using TSEs has several benefits including flexibility, abstraction, and incremental testability In one embodiment, a TSE is provided with the TSE used to generate instruction sequences forming a test program, or a portion of a test program, for a processor. The TSE is then changed with the changes resulting in a test program generation tool generating different instruction sequences with different properties. In some embodiments, the different instruction sequences with different properties target different specific parts of a processor.

In one embodiment, an automatic tool generates expressions from Hardware Definition Language (HDL) models of processors. Hence test programs are generated based on specific process implementations. Further, TSEs provide a high level of abstraction for describing test sequences. Accordingly, in some embodiments a set of TSEs used for one processor are also used for a second processor, with the first and second processor having different instruction sets. Still further, TSEs allow for incremental test program generation. If an instruction is added or its definition is modified, modification or addition to a TSE provides for generation of test programs covering only the new or the modified instruction. This feature is useful in regression testing. For example, if an instruction is modified, only relevant test programs are generated to the cover the modified instruction. This is in contrast to regenerating an entire set of test programs every time an instruction is modified. As another example, if a TSE is modified, only the relevant test programs are generated using the modified TSE rather than regenerating all of the test programs generated by all of the TSEs written for a processor.

Figure 6:
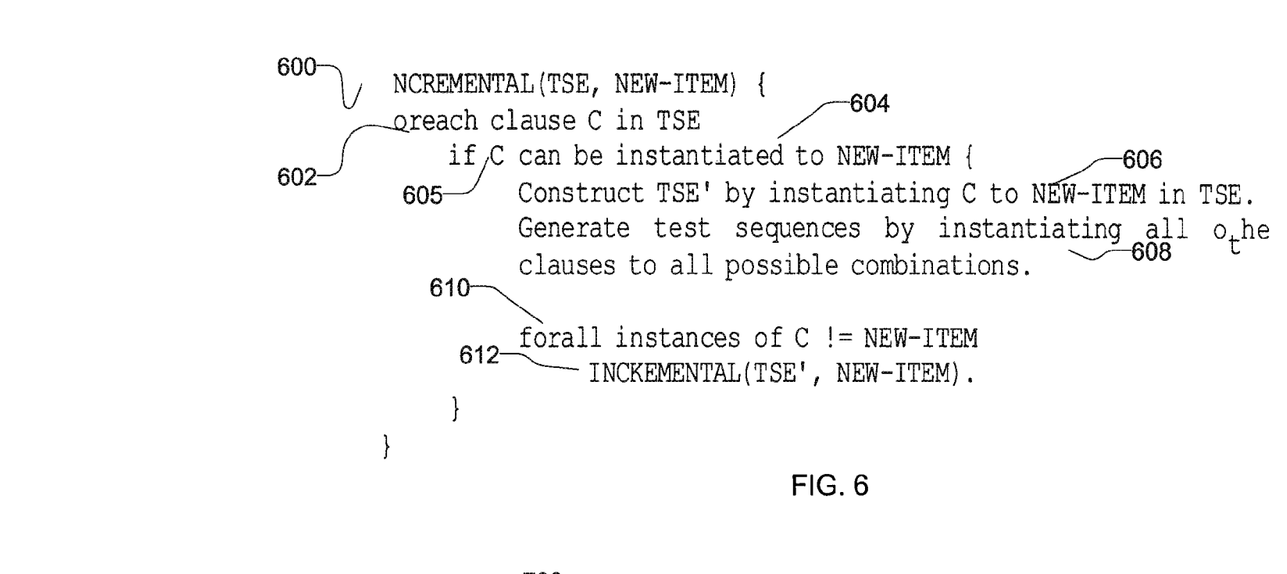
FIG. 6 is a pseudo-code representation of an incremental test program generation process in accordance with an exemplary embodiment of the present invention.

FIG. 6 is a pseudo-code representation of an incremental test program generation process in accordance with an exemplary embodiment of the present invention. If a new instruction is added to an instruction-set or its definition is modified, test programs can be generated to validate only the relevant parts. This feature may be used if the behavior of the design does not change for other instructions which might be the case in many processors designed to accept custom instructions.

The incremental test program generation process 600 generates (602) all test sequences that have at least one instance of NEW-ITEM. This is done by choosing (604) one clause of the TSE that can be instantiated to NEW-ITEM, clause C 605 and instantiating (606) it. After that all possible combinations of instances are generated (608) for the remaining clauses. In the next step, C is instantiated (610) to all values different than NEW-ITEM and all possible instances of the remaining clauses that have at least one instance of NEW-ITEM are generated (612) recursively. The incremental test program generation process decreases the size of test programs run after each modification in a processor instruction set according to a modification in a processor design. Note that the incremental test program generation process may also be used to generate test programs after modifying a TSE. For example, if a new member is added to a set, the incremental test program generation process generates only the relevant test sequences referencing that set thus decreasing the CPU time of running test programs.

In some embodiments, compaction of test programs is also performed through modification of TSEs. As an example, suppose a designer is interested in generating one two-instruction sequence starting with LOAD instruction, and one two-instruction sequence ending with a Memory instruction. With the help of TSEs the designer can generate [LOAD ADD] and [SUB LOAD] that can be compacted to [SUB LOAD ADD]. On the other hand without TSEs, the designer might generate [LOAD ADD] and [SUB STORE] that cannot be merged. Even if the designer had generated [LOAD ADD] and [SUB LOAD], in a long test program, discovering that these two sequences can be merged needs considerable amount of CPU time. Also, the second LOAD instruction might get deleted resulting in a [LOAD ADD SUB] sequence that is not what the designer had intended.

Figure 7:
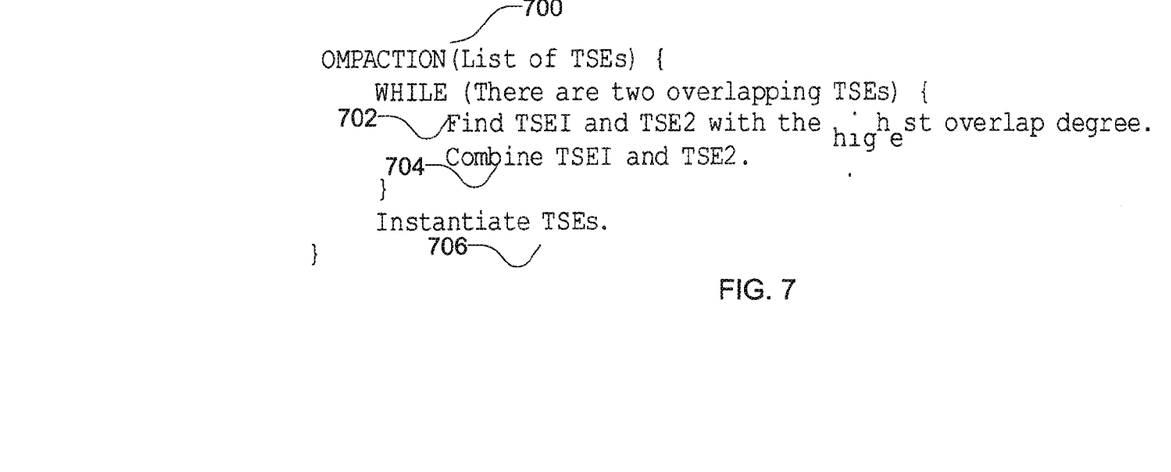
FIG. 7 is a pseudo-code description of a compaction process in accordance with an exemplary embodiment of the present invention.

FIG. 7 is a pseudo-code description of a compaction process in accordance with an exemplary embodiment of the present invention. The compaction process 700 starts with finding (702) two TSEs with the highest overlap degree. Two TSEs A and B are overlapping if it is possible to instantiate them in a way that A=A'.C and B=C.B', or A=A'.C.A' and B=C, where "." is the string concatenation operator. Note that according to the above definition, a TSE may overlap with itself. The size of C in the above definition is herein termed the overlap degree.

After finding two TSEs with the highest overlap degree, they are combined (704). During this step A and B might be partially instantiated or modified. For example, to combine two TSEs with a first TSE equal to #1(LOAD)$^2$(INST) and a second TSE equal to #1(MEM) (ALU)$^3$, the last clause of the first TSE, i.e., (INST) is replaced by (ALU) and the first clause of the second TSE is instantiated to LOAD instruction. The result is #1(LOAD)$^2$(ALU)$^3$. After combining all possible TSEs, they are instantiated (706) to generate test programs.

The following table is a context-free grammar, suitable for entry into a compiler generator (such as Bison), describing the syntactical elements of a TSE:

```
% {
# sets definition
# fields definition
% }
%token NUMBER IDENTIFIER
%type <string> test_program_specification;
%type <string> tse;
%type <string> quantizer;
%type <string> instructions;
%type <string> comparator;
%start test_program_specification
%%
test_program_specification:
        test_program_specification tse
        ;
tse:
        ' (' tse ') '
    | ' (' '!' tse ') '
    | ' (' tse ') ' ' ^ ' NUMBER
    | ' (' fields_constraints ') '
    | ' (' quantizer tse ') '
    | ' (' '= k' ') '
    | ' (' '!= k' ') '
    | set
    | instruction
    | ' { ' instructions ' } '
    | field_constraint
    | ' (' 'SWEEP' NUMBER NUMBER tse tse ') '
    | ' (' 'SWEEP' NUMBER NUMBER tse ') '
    | '(' 'RELATION' relation_type NUMBER ') '
    ;
fields_constraints:
        fields_constraints ',' field_constraint
field_constraint:
        field
    | field comparator NUMBER
    | field comparator '#' NUMBER
    | field 'IN' SET
    ;
instructions:
        instructions ',' instruction
quantizer:
        '#' NUMBER
    | '%' NUMBER
    | 'FORALL'
    ;
comparator:
        '='
    | '!='
    | '>'
    | '<'
    | '>='
    | '<='
    ;
set: IDENTIFIER;
instruction: IDENTIFIER;
field: IDENTIFIER;
relation_type: IDENTIFIER;
```

The tokens used in a TSE are: NUMBER and IDENTIFER. A NUMBER is an integer. An IDENTIFER is a character string identifying a set, instruction, field, or relation_type.

A "set" is a set or category generated by processing ISDL descriptions. Users can also define sets. An "instruction" and a "field" are defined in ISDL descriptions.

A "relation_type" is provided by a designer. This feature lets designers use some implementation specific information to generate better test programs. For example, if "inst0" is an instruction that updates the value of a flag and "inst1" is an instruction that reads the value of that flag, designers can give that information to a test program generator by the following line:

WR inst0 inst1, where WR is the RELATION_TYPE and means the relation is in the form of WRITE and READ. The format of the relation definition is:

RELATION_TYPE tse0 tse1, where tse0 and tse1 do not use any SWEEP and quantizer operators.

Other syntactical elements include:
- "!" is the NOT operator.
- "(tse)^n" is equivalent to repeating the (tse) n times. Example: $(tse)^3 == (tse)(tse)(tse)$
- "(=k)" means an instruction equal to the $k^{th}$ instruction.
- "(!=k)" means an instruction different than the $k^{th}$ instruction.
- "(SWEEP $NUM_L$ $NUM_H$ $tse_0$ $tse_1$)" means generate a set of test sequences in a way that $tse_0$ appears after the $(n-1)^{th}$ instruction of $tse_1$ for $NUM_L \leq n \leq NUM_H$. For example, (SWEEP 1 2 int5 (ADD)^3) generates: "int5 ADD ADD ADD"; and "ADD int5 ADD ADD". This can be used to generate test programs to validate the correctness of the design when interrupts in different cycles occur. (SWEEP NUM1 NUM2 tse) generates sequences of tse^n for all values of n between NUM1 and NUM2.
- (RELATION RELATION_TYPE NUM) generates an instruction in a way that it has a relation RELATION_TYPE with the instruction number NUM.
- (% NUMBER) means generate % NUMBER of possible sequences. During test program generation, a simple algorithm is used to estimate the total number of possible sequences. The estimation may not be accurate in some cases.

By analysis of the above context-free grammar, it can be seen that a TSE can be one of the following: a specific instruction; a set of instructions; an instruction field; or a combination of some TSEs and operators. The following are exemplary TSE operators as specified above:

| | |
|---|---|
| $\forall$ | Generate all possible instantiations of an expression |
| #n | Generate n different instantiations of an expression |
| { } | Define a set |
| ! | Complement |
| , | And operator |
| = | Equality operator |
| ( )$^n$ | Repeat the expression n times |
| Label k | Label the expression with k |

Designers can use different operators to write a TSE describing a desired test sequence. For example, if the designer's objective is to cover all possible three-instruction sequences, the following expression can be used:

$$\forall (W.OP)^3$$

As another example, #20 Label(Memory 1)(Cycle=2) (Stall=$Stall_1$)!(Arithmetic.float) is a TSE for the Arithmetic category of instructions and "Stall" and "Cycle" are fields in a the processor's ISDL description. The TSE describes twenty four-instruction sequences starting with a Memory instruction, their second instructions taking two cycles to execute, their third instructions having equal number of stalls with their first instructions, and their last instructions are not a floating point instruction.

As another example, the expression $\forall$(W.RA, W.RB, W.RC)$^2$ results in generating two-instruction sequences covering all different combinations of their registers. The generated sequences have the potential of discovering some errors in bypass logic of a processor.

As another example, (Arithmetic, Cycle=2) describes an Arithmetic instruction that takes two cycles to execute.

It is possible to define a set and use it in TSE. For example, the TSE:

$$NUM=\{0,-1,+1,2^{15}-1\}$$

$$\forall(MUL, R1 \in NUM, R2 \in NUM)$$

generates sequences of instructions to initialize the values of registers R1 and R2 to all possible combinations of the numbers written in set NUM and multiplies R1 and R2 to validate the multiplier under different values for the multiplier's inputs. As the above example illustrated, it is possible to initialize the values of registers while using TSE. Another feature of TSEs useful for writing data or address values is the ability to use ranges and don't cares and to bias the probability of using set members.

As another example, $\forall$(BRNCH, NOT-TAKEN) (Arithmetic)$^4$ (BRANCH) generates all sequences starting and ending with branches and separated with less than four arithmetic instructions, where the first branch will not be taken.

During test program generation, instantiations of instructions or fields can be done randomly, or in a way that maximizes the number of different values used. This feature is useful if an instruction has an immediate value, or an address.

In some cases it is desirable to have specific values for the immediate field, for example "MUL RD, RS, IMM". Suppose, it is desired to test the correctness of the implementation when the IMM value is positive, negative, 0, and 1. This can be easily done by defining a set including all desired values and using that set when writing a TSE.

A similar approach can be used to try different values for an address field that might have a page field and an offset field. While choosing different values for the page and/or offset field, it is possible to generate test programs that cause cache misses or page faults. Hence, targeting a memory management unit.

In an test program generator system in accordance with an exemplary embodiment of the present invention, an instruction set description written in ISDL description is used to categorize different instructions of a processor. By examining the ISDL fields, the test program generator system puts every instruction in one of the main categories or in the combination of several categories. The main categories are, "Arithmetic", "Logical", "Memory", "Control", and the "MISC" category that includes all the instructions that do not belong to other categories. During test program generation MISC category is treated differently than other categories. For example in order to cover the MISC category, every instruction of it has to be executed at least once, this may not be necessary for other categories.

It is possible to have an instruction placed in several categories, thus creating a combination of the above categories. For example, an instruction that reads two numbers from memory and adds them can be put in the Arithmetic and the Memory category.

Typically, the behavior of a processor during execution of different instructions in one category (ignoring MISC) are similar. This behavior can be used to decrease the number of requested instruction operations in a test program without sacrificing the quality of the generated test program. For example, assuming that a designer is interested in finding errors activated by interaction between several instructions, the designer might generate test programs to cover all two-instruction sequences. If the test program already covered [ADD LOAD] sequence, there is no need to cover [SUB LOAD] sequence, because this instruction sequence is unlikely to discover a new design error by simulating the second instruction sequence. This assumption may not be true if for example the number of cycles it takes to execute ADD is different than SUB.

In one test program generation tool in accordance with an exemplary embodiment of the present invention, the categories of the characterized instruction set description can be further characterized into sub-categories. For example, Arithmetic operators can be divided to Fixed-point and Floating-point sub-categories.

In one test program generation tool in accordance with an exemplary embodiment of the present invention, a report can be generated on different categories and their instructions and also statistics on minimum and maximum of different instruction's fields. Designers may use this report when writing TSEs.

Note that TSEs provide a high level of abstraction for defining test sequences without dealing with details. This makes it possible to port test programs developed for an old version of a processor to a newer one with possibly some extra instructions, or to one with totally different instructions. If the generated test programs using a TSE achieve full four-instruction sequence coverage for an old processor, the same TSE can achieve full coverage for the new processor.

Figure 5:
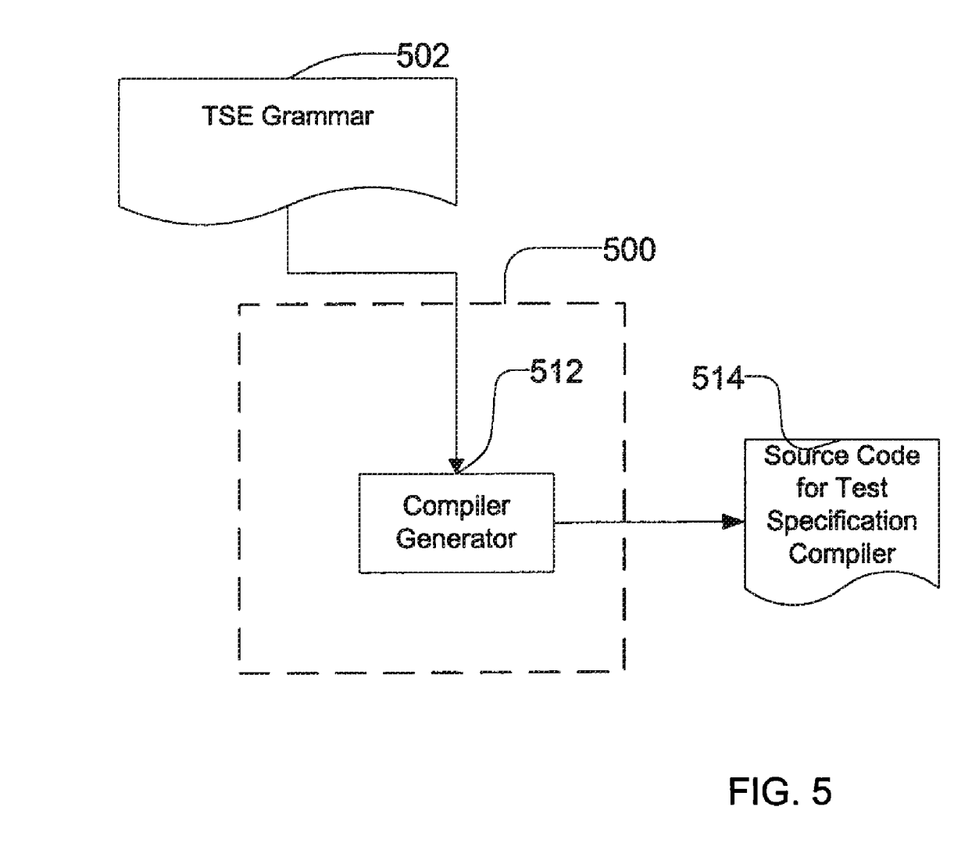
FIG. 5 is a process flow diagram of a test expression compiler generation process in accordance with an exemplary embodiment of the present invention.

FIG. 5 is a process flow diagram of a program generator creation process in accordance with an exemplary embodiment of the present invention. As described above, a program generator tool includes a TSE compiler that accepts a TSE and generates a test program. Additionally, as described above, a TSE can be expressed in a context free grammar; therefore, conventional lexical analyzers and compiler generators can be used to generate a TSE compiler. For a test program generator creation process 500, a TSE grammar 502 is specified including a context free grammar describing the structure of a TSE. The TSE grammar is used by a compiler generator 512 that reads in the TSE grammar and generates source code for a TSE compiler 514.

Figure 4:
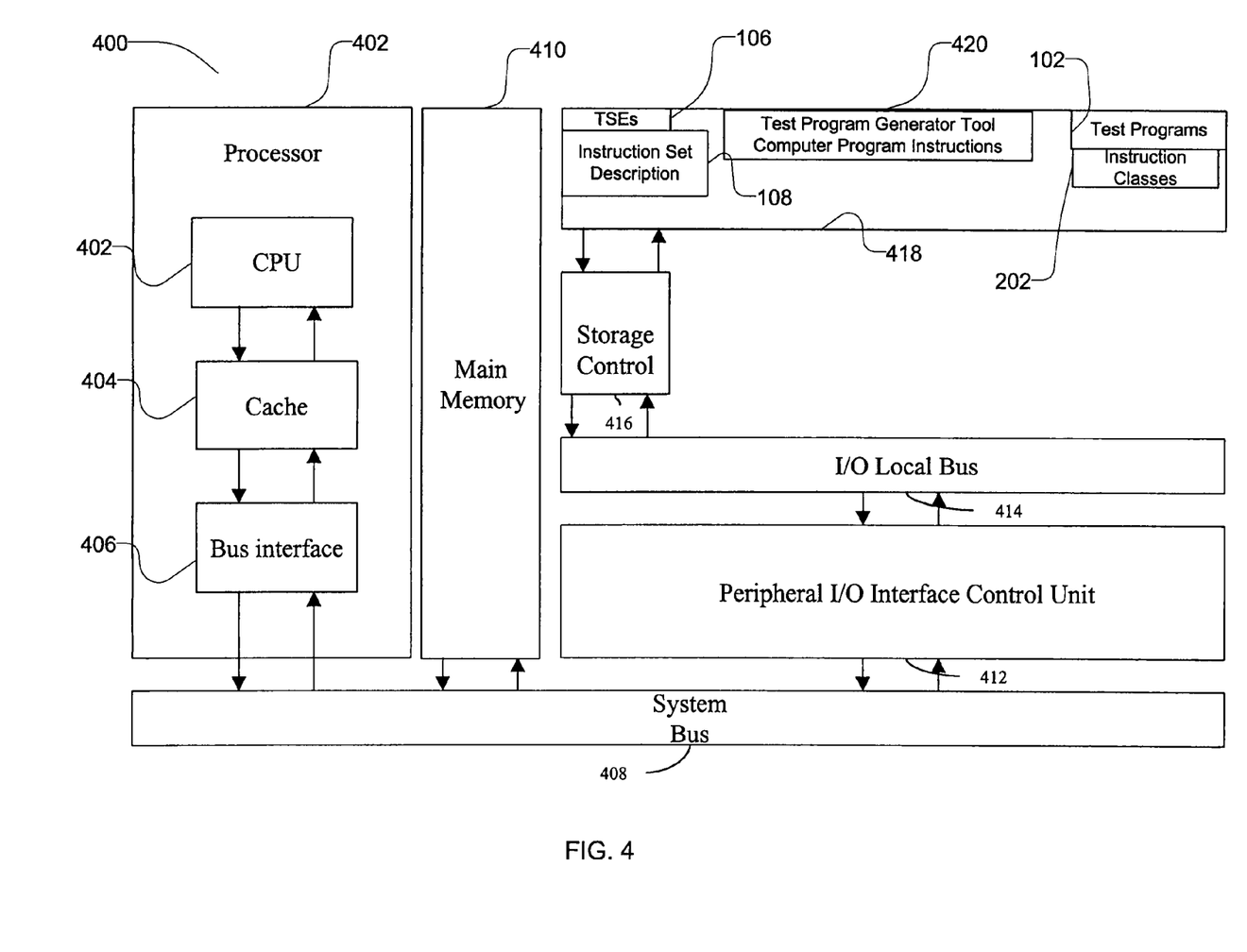
FIG. 4 is a computer architecture diagram of a test program generation system in accordance with an exemplary embodiment of the present invention.

FIG. 4 is a computer architecture diagram of a test program generator tool host in accordance with an exemplary embodiment of the present invention. A test program generator tool host 400 includes a processor 401 including a Central Processing Unit (CPU) 402, coupled to a memory cache 404, coupled to a bus interface 406. The bus interface is coupled via a system bus 408 to a main memory 410 and an I/O control unit 412. The I/O control unit is coupled via a I/O local bus 414 to a storage controller 416. The storage controller is further coupled to a storage device 418. The storage device includes files having previously described TSEs 106, instruction set descriptions 108, and computer program instructions 420 implementing the features of a test program generator tool.

In operation, the computer program instructions are retrieved from the storage device from and stored in the main memory by the processor. The processor then executes the computer program instructions stored in the main memory to implement the features of a test program generator. The test programs 102 and instruction classes 202 generated by the test program tool are stored as files on the storage device for later use by the designer.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method for generating a test program for a processor, comprising:
   receiving a formal description of an instruction set for the processor;
   receiving a formal description of a test specification, wherein the test specification is a Test Specification Expression; and
   generating a test program using the formal description of the instruction set and the formal description of the test specification.

2. The method of claim 1, wherein generating a test program further includes classifying the instruction set into categories.

3. The method of claim 2 wherein the instruction set is classified into arithmetic, logical, memory, control, and miscellaneous classes.

4. The method of claim 1, wherein the instruction set is described using Instruction Set Description Language.

5. The method of claim 1, further comprising:
   receiving an instruction relationship; and
   generating a test program further including using the instruction relationship, the formal description of the instruction set, and the formal description of the test specification.

6. The method of claim 1 further comprising receiving an incremental formal description of an instruction set for the processor wherein generating the test program further includes using the incremental formal description of an instruction set.

7. The method of claim 1 further comprising receiving an incremental formal description of a test specification wherein generating the test program further includes using the incremental formal description of a test specification.

8. The method of claim 1, wherein the formal description of a test specification includes an operator to generate all possible instantiations of an expression.

9. The method of claim 1, wherein the formal description of a test specification includes an operator to generate a specific number of different instantiations of an expression.

10. The method of claim 1, wherein the formal description of a test specification includes a set definition operator.

11. The method of claim 1, wherein the formal description of a test specification includes a complement operator.

12. The method of claim 1, wherein the formal description of a test specification includes a conjunction operator.

13. The method of claim 1, wherein the formal description of a test specification includes an equality operator.

14. The method of claim 1, wherein the formal description of a test specification includes an operator for repeating an expression a specified number of times.

15. The method of claim 1, wherein the formal description of a test specification includes an expression labeling operator.

16. A data processing system for generating a test program for a processor, comprising:
   a processor; and
   a memory operably coupled to the processor and having program instructions stored therein, the processor being operable to execute the program instructions, the program instructions including:

receiving a formal description of an instruction set for the processor;

receiving a formal description of a test specification, wherein the test specification is a Test Specification Expression; and generating a test program using the formal description of the instruction set and the formal description of the test specification.

17. The data processing system of claim 16, wherein generating a test program further includes classifying the instruction set into categories.

18. The data processing system of claim 17, wherein the instruction set is classified into arithmetic, logical, memory, control, and miscellaneous classes.

19. The data processing system of claim 16, wherein the instruction set is described using Instruction Set Description Language.

20. The data processing system of claim 16, the program instructions further including:

receiving an instruction relationship; and generating a test program further including using the instruction relationship, the formal description of the instruction set, and the formal description of the test specification.

21. The data processing system of claim 16, the program instructions further including:

receiving an incremental formal description of an instruction set for the processor; and generating the test program using the incremental formal description of an instruction set.

22. The data processing system of claim 16, the program instructions further including:

receiving an incremental formal description of a test specification; and generating the test program using the incremental formal description of a test specification.

23. The data processing system of claim 16, wherein the formal description of a test specification includes an operator to generate all possible instantiations of an expression.

24. The data processing system of claim 16, wherein the formal description of a test specification includes an operator to generate a specific number of different instantiations of an expression.

25. The data processing system of claim 16, wherein the formal description of a test specification includes a set definition operator.

26. The data processing system of claim 16, wherein the formal description of a test specification includes a complement operator.

27. The data processing system of claim 16, wherein the formal description of a test specification includes a conjunction operator.

28. The data processing system of claim 16, wherein the formal description of a test specification includes an equality operator.

29. The data processing system of claim 16, wherein the formal description of a test specification includes an operator for repeating an expression a specified number of times.

30. The data processing system of claim 16, wherein the formal description of a test specification includes an expression labeling operator.

31. A method of generating a test program for a processor design, the processor design being based on a specification of a processor, the test program being applied to the processor design and causing specified operation of the processor design, the specified operation of the processor design forming results for comparison with the specification of the processor, the method comprising:

formally describing an instruction set for the processor, the instruction set for the processor including multiple instructions, a formal description of the instruction set providing definitions for instructions of the multiple instructions;

formally describing a test specification using expressions, the expressions representing operations of the processor, wherein the test specification is a Test Specification Expression; and generating a test program using the formal description of the instruction set and the test specification, the definitions for instructions of the multiple instructions being mappable to expressions of the test specification, the instructions of the instruction set being mappable to the definitions for instructions of the multiple instructions.

32. The method of claim 31, wherein generating a test program further includes classifying the multiple instructions into categories.

33. The method of claim 32 wherein the multiple instructions are classified into arithmetic, logical, memory, control, and miscellaneous classes.

34. The method of claim 31, wherein the multiple instructions are described using Instruction Set Description Language.

35. The method of claim 31, further comprising:

receiving an instruction relationship; and generating a test program further including using the instruction relationship, the formal description of the multiple instructions, and the test specification.

36. The method of claim 31 further comprising receiving an incremental formal description of an instruction set for the processor wherein generating the test program further includes using the incremental formal description of an instruction set.

37. The method of claim 31 further comprising receiving an incremental formal description of a test specification wherein generating the test program further includes using the incremental formal description of a test specification.

38. The method of claim 31, wherein the formal description of a test specification includes an operator to generate all possible instantiations of an expression.

39. The method of claim 31, wherein the formal description of a test specification includes an operator to generate a specific number of different instantiations of an expression.

40. The method of claim 31, wherein the formal description of a test specification includes a set definition operator.

41. The method of claim 31, wherein the formal description of a test specification includes a complement operator.

42. The method of claim 31, wherein the formal description of a test specification includes a conjunction operator.

43. The method of claim 31, wherein the formal description of a test specification includes an equality operator.

44. The method of claim 31, wherein the formal description of a test specification includes an operator for repeating an expression a specified number of times.

45. The method of claim 31, wherein the formal description of a test specification includes an expression labeling operator.

46. The method of claim 31, wherein the formal description of a test specification includes nested test specification expressions.

* * * * *